United States Patent [19]

Drees

[11] Patent Number: 5,209,398
[45] Date of Patent: May 11, 1993

[54] MODEL-BASED THERMOBALANCE WITH FEEDBACK

[75] Inventor: Kirk H. Drees, West Lafayette, Ind.

[73] Assignee: Johnson Service Company, Milwaukee, Wis.

[21] Appl. No.: 940,089

[22] Filed: Sep. 2, 1992

[51] Int. Cl.$^5$ .............................................. G05D 23/00
[52] U.S. Cl. .............................. 236/91 F; 236/9 A; 236/37; 236/49.3; 165/16
[58] Field of Search .................. 236/91 R, 91 F, 91 C, 236/36, 37, 1 B, 10, 11, 49.1, 49.3, 9 A, 9 R; 237/2 R, 2 A; 165/16, 39

[56] References Cited

U.S. PATENT DOCUMENTS

| | | | |
|---|---|---|---|
| 4,548,355 | 10/1985 | Stolz et al. | 236/37 |
| 4,630,670 | 12/1986 | Wellman et al. | 165/16 |
| 4,757,944 | 7/1988 | Kagohata et al. | 236/91 F |
| 5,139,197 | 8/1992 | Seshomo et al. | 236/49.3 |

OTHER PUBLICATIONS

Five (5) page brochure of Krueger (Divison of Philips Industries) entitled "System 3–Custom DDC VAV Laboratory Ventilation Equipment, 1988".

*Primary Examiner*—Harry B. Tanner
*Attorney, Agent, or Firm*—Foley & Lardner

[57] ABSTRACT

A temperature control system and method for maintaining the temperature of air within an air pressure controlled enclosure at a desired temperature. The system uses an energy flow model to determine the temperature to which the air supplied to the enclosure must be heated to attain the desired temperature within the enclosure. The energy flow model determines the desired supply air temperature based on the temperature and flow rate of the supply air, the current temperature of the air in the enclosure, the heat transfer rate within the enclosure, and the temperature and flow rate of make-up air entering the enclosure.

14 Claims, 2 Drawing Sheets

MODEL-BASED THERMOBALANCE WITH FEEDBACK

FIELD OF INVENTION

The present invention relates to a feedback system and method for controlling the temperature of the air in a contained space, and more particularly to a feedback control system which implements a heat flow model to control the temperature of the air in a contained space while the air pressure of the contained space is being controlled by an air pressure controller.

BACKGROUND OF THE INVENTION

Many contained spaces, such as laboratories and production areas, require either positive or negative space pressure control to prevent contaminants from either entering or leaving a designated location. It is often also necessary to control the air temperature within these pressure-controlled spaces.

Typically, to monitor and control air pressure and air temperature within the same given space, two independent feedback control systems are used. Of these two systems, the pressure control system typically has a much shorter time constant than the temperature control system. For example, the time constant of pressure control loops generally range from 15 to 60 seconds. In contrast, the time constant of space temperature control loops generally range from 5 to 15 minutes, depending on the ventilation rate in the room relative to the room's size as well as the mass of the space temperature sensor.

Due to the difference in time constants, the space pressure control is capable of varying the amount of supply air introduced into the space at a much faster rate than the space temperature control can sense and compensate for this thermo upset. As a result, significant offset levels between the actual space temperature and the desired space temperature (the room temperature setpoint) can occur. Offset levels as large as 5–10 degrees fahrenheit have been observed.

To increase the accuracy of temperature control systems which control the temperature of airspace having pressure controlled by a pressure control system, temperature control systems which employ thermo energy models have been developed. For example, such a system has been developed by Krueger, Inc., and is described in System 3: Custom DDC VAV Laboratory Ventilation Equipment published in 1988.

The Krueger temperature control system utilizes a very simple thermo energy model to decrease the time constant of its temperature control loop. The Kruger temperature control system heats supply air as it flows into a room based on the room temperature, the duct temperature, and the room temperature setpoint. However, the accuracy of the Krueger system is impeded by its failure to compensate for other temperature-affecting factors, such as the rate at which the heated air is being supplied to the room and the mass and temperature of air entering the enclosure through means other than the supply air duct of the air pressure controller.

Thus, it is clearly desirable to provide a system and method for decreasing the time constant of an air temperature control system disposed to maintain the temperature of a pressure-controlled air space. It is further desirable to provide a device and method for controlling the temperature of a room which implements a more comprehensive energy flow model than is currently provided in the art. It is further desirable to provide a system which controls the air temperature of an enclosed space with greater accuracy than is achieved by systems currently implementing energy flow models.

SUMMARY OF THE INVENTION

The present invention provides a system for maintaining, at a room temperature setpoint, the temperature of air within an enclosure having a supply duct and an exhaust duct. The system includes heating means for heating the air in the supply duct responsive to a control signal, a first temperature sensor for generating a room temperature signal indicative of the temperature of the air in the enclosure, and a second temperature sensor for generating a supply air temperature signal indicative of the temperature of the air heated by the heater means. The system further includes a first air flow sensor for generating a supply air flow signal indicative of the air flow in the supply duct, a second air flow sensor for generating an exhaust air flow signal indicative of the air flow in the exhaust duct, and a temperature controller coupled to the first temperature sensor, the second temperature sensor, the first air flow sensor, and the second air flow sensor. The temperature controller is further coupled to the heating means and provides the heating means with the control signal in response to the room temperature signal, the supply air temperature signal, the supply air flow signal, the exhaust air flow signal, and the room temperature setpoint.

The present invention further provides a method for maintaining the temperature of air in an enclosure at a desired temperature, wherein supply air enters the enclosure through a supply duct, exhaust air leaves the enclosure through an exhaust duct, and make-up air enters the enclosure from an exterior environment. The method includes the steps of providing a temperature controller, applying a signal indicative of the temperature of the air in the enclosure to the temperature controller, and determining a heat transfer rate based on the temperature of the air in the enclosure and the desired temperature. The method further includes the steps of applying a signal indicative of the flow of the supply air to the temperature controller, applying a signal indicative of the flow of the exhaust air to the temperature controller, and determining the flow of the make-up air based on the flows of the supply air and the exhaust air. A desired supply air temperature is then determined based on the flow of the supply air, the flow of the make-up air, the temperature of the air in the enclosure, the desired temperature, and the heat transfer rate. The supply air is then heated to the desired supply air temperature.

BRIEF DESCRIPTION OF THE DRAWINGS

The features of the present invention, which are believed to be novel, are set forth with particularity in the appended claims. The invention, together with further objects and advantages thereof, may best be understood by making reference to the following description taken in conjunction with the accompanying drawings, in the several figures of which like reference numerals identify like elements, and wherein:

DETAILED DESCRIPTION OF THE PREFERRED EMBODIMENT

Figure 1:
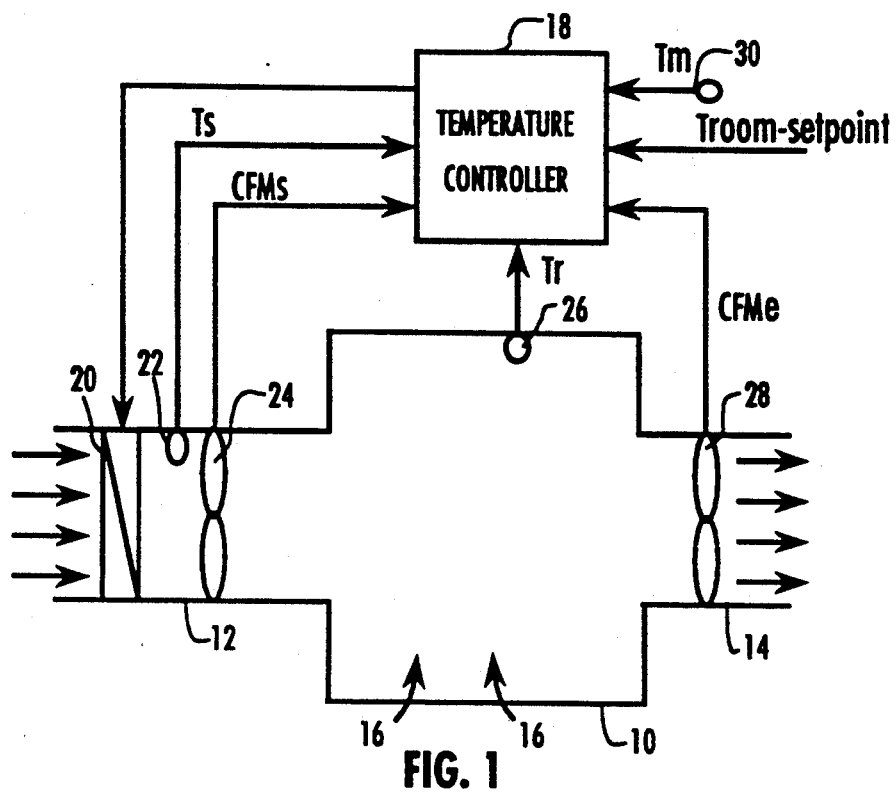
FIG. 1 is a schematic block diagram illustrating the principle components of a temperature control system in accordance with the present invention.

Referring to FIG. 1, an enclosure 10 is shown having a supply duct 12 and an exhaust duct 14. An air pressure controller (not shown) supplies air through supply duct 12 to the air space within enclosure 10 to provide positive or negative space pressure as exhaust air leaves enclosure 10 through exhaust air duct 14. External or make-up air 16 enters enclosure 10 through interstices in the walls, floor or ceiling, in addition to variable openings such as doors or windows.

According to the preferred embodiment of the present invention, a temperature control system 18 is connected to an air heater 20, a supply air temperature sensor 22, a supply air flow sensor 24, a room temperature sensor 26, an exhaust air flow sensor 28, and an external air temperature sensor 30. Supply air temperature sensor 22 is located in supply duct 12 between air heater 20 and the air space within enclosure 10. Thus positioned, supply air temperature sensor 22 monitors the temperature of the supply air after it has flowed through and has been heated by air heater 20. Sensor 22 transmits a signal indicative of the temperature of the heated supply air ($T_S$) to temperature controller 18.

Air flow sensors 24 and 28 monitor the volumetric flow rates of the air flowing through supply duct 12 and exhaust duct 14, respectively, and transmit signals indicative thereof ($CFM_S$, $CFM_C$) to temperature controller 18. Temperature sensor 26 and temperature sensor 30 monitor the temperature of the air within enclosure 10 and the temperature of external air, respectively, and transmit signals indicative thereof ($T_r$, $T_m$) to temperature controller 18.

According to an alternative embodiment of the invention, external temperature sensor 30 may be replaced with a fixed constant representative of $T_m$. This alternative embodiment is preferred when the external temperature $T_m$ is relatively invariant. Such is the case, for example, when enclosure 10 is itself enclosed within a larger enclosure, the temperature of which is controlled. Under such circumstances, a fixed constant $T_m$ may be used without sacrificing the accuracy of temperature control, thus avoiding the expense of external temperature sensor 30.

Temperature controller 18 receives the signals indicative of the supply air temperature, supply air flow, exhaust air flow, enclosure air temperature, and external air temperature, and, based on an energy flow model, controls air heater 20 to heat the supply air to the temperature necessary to maintain the air space within enclosure 10 at a specified temperature ($T_{room\text{-}setpoint}$). The energy flow model implemented in temperature controller 18 will be discussed in greater detail below.

Figure 2:
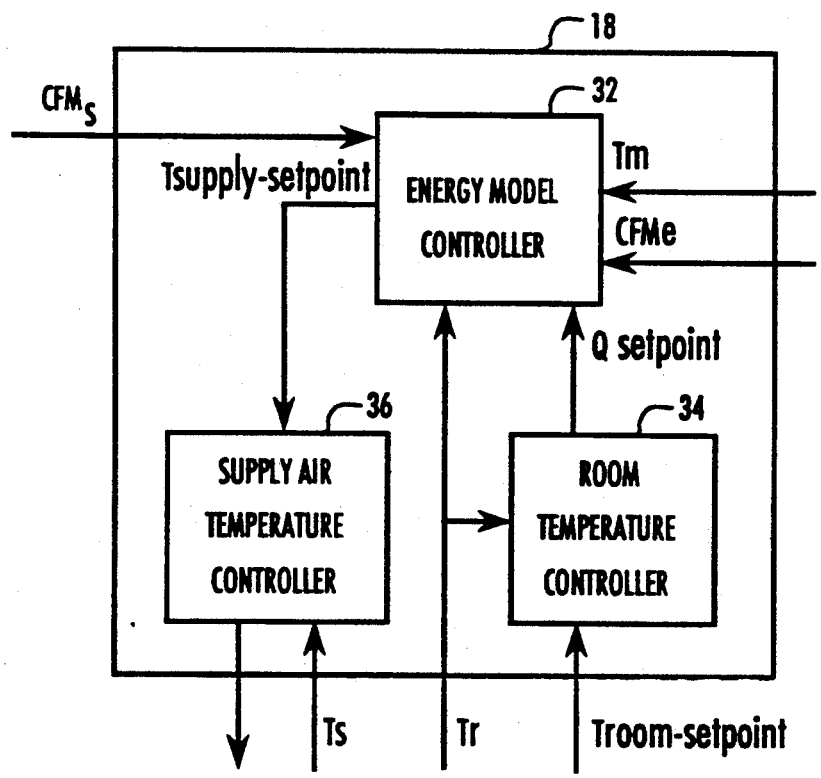
FIG. 2 is a schematic block diagram illustrating the principle components of the temperature controller disposed in the system of FIG. 1.

Referring to FIG. 2, it illustrates a temperature controller 18 which may be utilized in the system of FIG. 1 in accordance with the present invention. The temperature controller 18 generally comprises an energy model controller 32, a room temperature feedback controller 34, and a supply air temperature feedback controller 36. Room temperature feedback controller 34 receives a signal indicative of $T_r$ from room temperature sensor 26 and a signal indicative of $T_{room\text{-}setpoint}$. Responsive to these signals, room temperature feedback controller 34 generates a heat transfer setpoint ($Q_{setpoint}$) which it provides to energy model controller 32.

Figure 3:
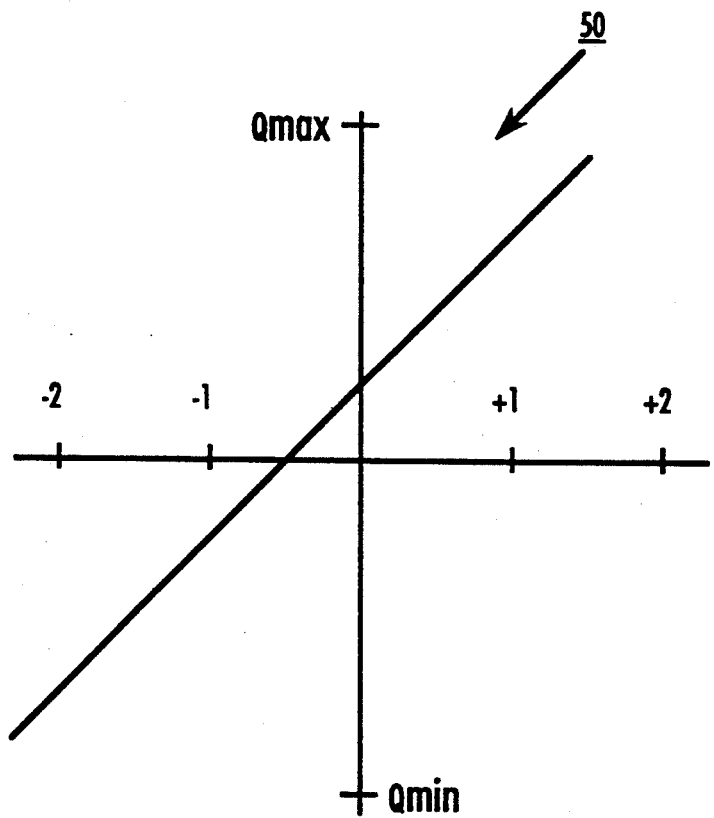
FIG. 3 is a diagram of a linear feedforward model by which a room temperature feedback controller implemented in accordance with the present invention estimates a heat transfer setpoint based upon the sign and magnitude of a space temperature control offset.

The heat transfer setpoint ($Q_{setpoint}$) is an estimate of the rate at which heat is added to the airspace of enclosure 10 by, for example, electrical devices, people, or exothermic processes within the space, as well as heat transferred between the space and the surrounding environment through the walls of enclosure 10. $Q_{setpoint}$ is generated by room temperature feedback controller 34 pursuant to a method of heat transfer estimation implemented by controller 34 which will now be described in greater detail with reference to FIG. 3.

Because it is not practical to directly measure or calculate the room heat transfer setpoint ($Q_{setpoint}$), this value must be estimated responsive to $T_r$ ant $T_{room\text{-}setpoint}$. According to the preferred embodiment of the invention, room temperature feedback controller 34 estimates $Q_{setpoint}$ by determining the sign and magnitude of the space temperature control offset ($STC_{offset}$), which represents the difference between $T_r$ and $T_{room\text{-}setpoint}$. Once $STC_{offset}$ is determined, $Q_{setpoint}$ is generated in accordance with a linear feedforward model 50 where the X-axis represents $STC_{offset}$ and the Y-axis represents the corresponding $Q_{setpoint}$. If $STC_{offset}$ is above a predetermined positive threshold value, $Q_{setpoint}$ is set to a predetermined maximum value (Qmax). Conversely, if $STC_{setpoint}$ is below a predetermined negative threshold value, $Q_{setpoint}$ is set to a predetermined minimum value (Qmin).

In an alternative embodiment, a feedback controller with proportional and integral capabilities (P.I. controller) could be used to determine $Q_{setpoint}$ as a function of $STC_{setpoint}$. Specifically, $Q_{setpoint}$ may be determined by the formula $$\dot{Q}_{setpoint}(t) = K_p \left( STC_{offset}(t) + \frac{1}{T_I} \int_0^t STC_{offset}(t) dt \right) \quad (1)$$

where $K_p$ is proportional gain and $T_I$ is integral time.

Again referring to FIG. 2, energy model controller 32 receives $T_r$ from room temperature sensor 26, $Q_{setpoint}$ from room temperature feedback controller 34, $CFM_c$ from exhaust air flow sensor 28, $CFM_s$ from supply air flow sensor 24, and $T_m$ from external air temperature sensor 30. Responsive to these signals, energy model controller 32 generates a signal indicative of the temperature to which the supply air must be heated ($T_{supply\text{-}setpoint}$) to maintain the temperature of the enclosed air space at $T_{room\text{-}setpoint}$.

According to the preferred embodiment of the invention, $T_{supply\text{-}setpoint}$ is generated according to a heat flow model represented by equation 2, where $CFM_c$ is the volumetric flow rate of the exhaust air, $T_r$ is the temperature of the room, $CFM_m$ is the volumetric flow rate of makeup air, $T_m$ is the temperature of the makeup air, $Q_{setpoint}$ is the estimated heat flow rate, and $CFM_S$ is the volumetric flow rate of supply air. While $CFM_c$ is not directly measurable, it is determined by subtracting the volumetric flow rate of the exhaust air ($CFM_c$) from the volumetric flow rate of the supply air ($CFM_s$), which signals are supplied by exhaust air flow sensor 28 and supply air flow sensor 24 respectively.

$$T_s = [(CFM_c \bullet T_r) - (CFM_m \bullet T_m) - (0.926 \bullet \dot{Q}_{setpoint})] / CFM_S \quad (2)$$

Supply air temperature feedback controller 36 may be a conventional closed-loop feedback controller disposed to control air heater 20 to heat the supply air to the temperature represented by $T_{supply\text{-}setpoint}$ in response to the feedback signal ($T_s$) generated by supply air temperature sensor 22. As $T_{supply\text{-}setpoint}$ represents the temperature to heat the supply air to maintain the temperature of the air space enclosed by enclosure 10 at $T_{room\text{-}setpoint}$, the temperature of the air enclosed by enclosure 10 is accurately controlled. Further, the time constant of the control loop of temperature control system 18 is reduced significantly by changing the effective temperature control loop to that defined by heater 20 and sensor 22. The present invention further provides increased accuracy by adjusting the $T_{supply\text{-}setpoint}$ in response to changes in the temperature of exterior air and changes in the flow rate of the supply and make-up air, which changes may significantly alter the supply air temperature required to maintain the temperature of the enclosed space.

While particular embodiments of the present invention have been shown and described, modifications may be made. For example, supply duct 12 and exhaust duct 14 may be replaced by any number of supply and exhaust ducts. In such multi-duct systems, the volumetric flow rate of the supply air would be the sum of the flow rates of the various supply ducts. Likewise, the volumetric flow rate of the exhaust air would be the sum of the flow rates of the various exhaust ducts. Therefore, it is intended in the appended claims to cover all such changes and modifications which fall within the true spirit and scope of the invention.

What is claimed is:

1. A system for maintaining, at a room temperature setpoint, the temperature of air within an enclosure comprising a supply duct and an exhaust duct, said system comprising:
   heating means for heating the air in said supply duct responsive to a control signal;
   a first temperature sensor for generating a room temperature signal indicative of the temperature of the air in said enclosure;
   a second temperature sensor for generating a supply air temperature signal indicative of the temperature of the air heated by said heater means;
   a first air flow sensor for generating a supply air flow signal indicative of the air flow in said supply duct;
   a second air flow sensor for generating an exhaust air flow signal indicative of the air flow in said exhaust duct; and
   a temperature controller coupled to said first temperature sensor, said second temperature sensor, said first air flow sensor, and said second air flow sensor, said temperature controller being further coupled to said heating means for providing said heating means with said control signal in response to said room temperature signal, said supply air temperature signal, said supply air flow signal, said exhaust air flow signal, and said room temperature setpoint.

2. The system of claim 1 wherein said temperature controller includes an energy model controller and a room temperature controller, said room temperature controller being responsive to said room temperature signal and said room temperature setpoint for providing a heat transfer rate signal to said energy model controller.

3. The system of claim 2 wherein said temperature controller further includes a supply air temperature controller and wherein said energy model controller is responsive to said heat transfer rate signal, said room temperature signal, said supply air flow signal, and said exhaust air flow signal for providing a supply air temperature setpoint signal to said supply air temperature controller.

4. The system of claim 3 wherein said supply air temperature controller is responsive to said supply air temperature signal and said supply air temperature setpoint signal for providing said control signal to said heater.

5. The system of claim 3 further comprising a third temperature sensor for sensing the temperature of air external to said enclosure, said third temperature sensor being coupled to said energy model controller for providing said energy model controller with a signal indicative of the temperature of said external air.

6. The system of claim 5 wherein said energy model controller generates said supply air temperature setpoint signal according to the equation:

$$T_s = [(CFM_e \cdot T_r) - (CFM_m \cdot T_m) - (0.926 \cdot \dot{Q}_{setpoint})]/CFM_S$$

where $T_s$ is said supply air temperature setpoint, $CFM_c$ is the volumetric flow rate of the exhaust air, $T_r$ is the temperature of the air in said enclosure, $CFM_m$ is the volumetric flow rate of makeup air, $T_m$ is the temperature of the air external to said enclosure, $Q_{setpoint}$ is the heat transfer rate, and $CFM_s$ is the volumetric flow rate of supply air, wherein $CFM_m$ is the difference between $CFM_c$ and $CFM_s$.

7. A method of maintaining the temperature of air in an enclosure at a desired temperature, wherein supply air enters said enclosure through one or more supply ducts, exhaust air leaves said enclosure through one or more exhaust ducts, and make-up air enters said enclosure from an exterior environment, said method including the steps of:
   providing a temperature controller;
   applying a signal indicative of the temperature of the air in said enclosure to said temperature controller;
   determining a heat transfer rate based on the temperature of the air in said enclosure and said desired temperature;
   applying a signal indicative of the flow of said supply air to said temperature controller;
   applying a signal indicative of the flow of said exhaust air to said temperature controller;
   determining the flow of said make-up air based on the flows of said supply air and said exhaust air;
   determining a desired supply air temperature based on the flow of said supply air, the flow of said make-up air, the temperature of the air in said enclosure, said desired temperature, and said heat transfer rate; and
   heating said supply air to said desired supply air temperature.

8. The method of claim 7 wherein the step of heating said supply air includes the steps of:
   providing a means for heating said supply air;
   applying a signal indicative of the temperature of the supply air to said temperature controller;
   determining the difference between the temperature of the supply air and the desired supply air temperature; and controlling said heating means based on the difference between the temperature of the supply air and the desired supply air temperature.

9. The method of claim 7 wherein said temperature controller comprises a supply air temperature controller, a room temperature controller, and an energy model controller coupled to said room temperature controller and said supply air temperature controller.

10. The method of claim 9 including the further steps of applying said signal indicative of the temperature of the air in said enclosure and a signal indicative of said desired temperature to said room temperature controller; causing said room temperature controller to perform said step of determining a heat transfer rate based on the temperature of the air in said enclosure and said desired temperature;

causing said room temperature controller to generate a signal indicative of said heat transfer rate; and applying to said energy model controller said signal indicative of said heat transfer rate.

11. The method of claim 10 including the further steps of:

applying said signal indicative of said heat transfer rate, said signal indicative of the temperature of the air in said enclosure, said signal indicative of the flow of said supply air, and said signal indicative of the flow of said exhaust air to said energy model controller;

causing said energy model controller to perform said step of determining the flow of said make-up air based on the flows of said supply air and said exhaust air;

causing said energy model controller to perform said step of determining a desired supply air temperature based on the flow of said supply air, the flow of said make-up air, the temperature of said make-up air, said desired temperature, the temperature of the air in said enclosure, and said heat transfer rate;

causing said energy model controller to generate a signal indicative of said supply air temperature setpoint; and applying to said supply air temperature controller said signal indicative of said supply air temperature setpoint.

12. The method of claim 11 including the further steps of applying to said supply air temperature controller said signal indicative of the temperature of the supply air and said signal indicative of said supply air temperature setpoint; and causing said supply air temperature controller to perform said step of heating said supply air to said desired supply air temperature.

13. The method of claim 11 further comprising the step of providing an external air temperature sensor, wherein the temperature of the make-up air is provided by said external air temperature sensor.

14. The method of claim 11 wherein the temperature of the make-up air is provided by a predetermined fixed constant.

* * * * *